US009404608B2

(12) United States Patent
Lippka (10) Patent No.: US 9,404,608 B2
(45) Date of Patent: Aug. 2, 2016

(54) SYSTEMS AND METHODS FOR PIPE COUPLINGS (75) Inventor: Sandra M. Lippka, Warwick, RI (US)

(73) Assignee: Tyco Fire Products LP, Lansdale, PA (US)

( * ) Notice: Subject to any disclaimer, the term of this patent is extended or adjusted under 35 U.S.C. 154(b) by 899 days.

(21) Appl. No.: 13/504,097

(22) PCT Filed: Oct. 25, 2010

(86) PCT No.: PCT/US2010/053970
§ 371 (c)(1),
(2), (4) Date: Jun. 21, 2012

(87) PCT Pub. No.: WO2011/056512
PCT Pub. Date: May 12, 2011

(65) Prior Publication Data
US 2012/0248767 A1 Oct. 4, 2012

Related U.S. Application Data (60) Provisional application No. 61/255,409, filed on Oct. 27, 2009.

(51) Int. Cl.
F16L 17/04 (2006.01)
F16L 21/00 (2006.01)

(52) U.S. Cl.
CPC .............. *F16L 17/04* (2013.01); *F16L 21/005* (2013.01); *Y10T 29/49826* (2015.01)

(58) Field of Classification Search
CPC ....... F16L 17/073; F16L 21/06; F16L 21/065; F16L 23/04; F16L 25/08
See application file for complete search history.

(56) References Cited

U.S. PATENT DOCUMENTS

| 1,607,943 A | 11/1926 | James et al. |
| 2,028,182 A | 1/1936 | Barnickol, Jr. |
| 3,129,920 A | 4/1964 | Stillwagon |
| 3,291,506 A | 12/1966 | Blakeley et al. |
| 3,351,352 A | 11/1967 | Blakeley et al. |

(Continued)

FOREIGN PATENT DOCUMENTS

| CN | 1041213 A | 4/1990 |
| CN | 1231026 A | 10/1999 |

(Continued)

OTHER PUBLICATIONS

European Examination Report for EP Application 10774372.6; Applicant Tyco Fire Products LP; Mail Date Jun. 6, 2013; pp. 7.
International Search Report and Written Opinion for International Application PCT/US2010/053970; Applicant Tyco Fire Properties LP; Mail Date Mar. 18, 2011; 25 pages.
Second European Examination Report for EP Application 10774372.6; Applicant Tyco Fire Products LP; Mail Date May 27, 2014; pp. 9.

(Continued)

*Primary Examiner* — Daniel Wiley
(74) *Attorney, Agent, or Firm* — Perkins Coie LLP (57) ABSTRACT A coupling arrangement that includes a gasket seal (40) and a housing (12, 14) having a first lateral side (100) for receiving a first pipe segment (4) and a second lateral side (102) for receiving a second pipe segment (2), the second lateral side (102) being spaced from the first lateral side (100) to define a medial axis (A-A) of the housing. An inner surface (22) of the housing defines a cavity for engaging and housing a gasket seal (40) disposed about the first and second pipe segments. The gasket seal (40) includes a peripheral surface (48) and inner surface (50) which can include features that engage both the housing and the pipe segments to form a fluid tight pipe joint assembly.

20 Claims, 7 Drawing Sheets (56) References Cited

U.S. PATENT DOCUMENTS

| | | | |
|---|---|---|---|
| 3,362,730 A * | 1/1968 | St Clair et al. | 285/108 |
| 4,350,350 A | 9/1982 | Blakeley et al. | |
| 4,915,418 A * | 4/1990 | Palatchy | 285/24 |
| 5,018,768 A * | 5/1991 | Palatchy | 285/24 |
| 5,961,161 A | 10/1999 | Sponer et al. | |
| 6,139,069 A | 10/2000 | Radzik | |
| 2005/0253029 A1* | 11/2005 | Gibb et al. | 248/158 |
| 2005/0253383 A1 | 11/2005 | Gibb et al. | |
| 2007/0040336 A1* | 2/2007 | Sun et al. | 277/608 |
| 2008/0284161 A1* | 11/2008 | Dole et al. | 285/148.8 |

FOREIGN PATENT DOCUMENTS

| | | |
|---|---|---|
| DE | 925743 C | 3/1955 |
| DE | 1132394 B | 6/1962 |
| DE | 3826114 A * | 2/1990 |
| DE | 10006029 A1 | 8/2001 |
| FR | 2184203 A7 | 12/1973 |
| GB | 913904 A | 12/1962 |
| JP | 60124183 A | 7/1985 |
| WO | 2004097270 A2 | 11/2004 |
| WO | 2009045525 A2 | 4/2009 |
| WO | 2009107061 A1 | 9/2009 |

OTHER PUBLICATIONS

Verified English translation of DE 38 26 114 A1, Feb. 15, 1990, Rasmussen GmbH, 14 pages.
U.S. Appl. No. 61/255,409, filed Oct. 27, 2009, Oct. 7, 2015.
European Application No. 10774372.6 dated Oct. 7, 2015 from the EPO Patent Register.
Tyco Fire & Suppression Products Publication IH -1000FP, entitled, GRINNELL®- Grooved Fire Protection Installation Manual (Aug. 2007), p. 12.
First Office Action with English translation issued in related co-pending Chinese Application No. 201080056926, Feb. 8, 2014, 16 pages.
Response to Feb. 8, 2014 First Office Action filed in related co-pending Chinese Application No. 201080056926, Jun. 23, 2014, 17 pages.
First Office Action with English translation issued in related co-pending Japanese Application No. 2012-536926, Sep. 5, 2014, 7 pages.
Written Opinion issued in related co-pending Singapore Application No. 201203040-9, Jun. 26, 2013, 12 pages.
Response to Jun. 26, 2013 Written Opinion issued in related co-pending Singapore Application No. 201203040-9, Nov. 19, 2013, 14 pages.

* cited by examiner

SYSTEMS AND METHODS FOR PIPE COUPLINGS

PRIORITY DATA & INCORPORATION BY REFERENCE

This application is a 35 U.S.C. §371 application of International Application No. PCT/US2010/053970 filed Oct. 25, 2010, which claims the benefit of priority to U.S. Provisional Patent Application No. 61/255,409, filed Oct. 27, 2009, each of which is incorporated by reference in its entirety.

TECHNICAL FIELD

This invention relates generally to pipe fittings and more specifically devices and methods for coupling fluid conveying piping or tubing.

SUMMARY OF THE INVENTION

Provided are preferred coupling arrangements and their components for joining pipe or tube segments. In one preferred embodiment, a coupling is provided that includes a housing; and a gasket disposed in the housing for forming a seal about a pipe joint. The gasket is an annular or ring-type body having a first lateral side and a second lateral side spaced from the first lateral side so as to define a medial axis therebetween. An exterior or peripheral surface of the gasket and an inner surface of the gasket extend between the first and second lateral surfaces so as to be bisected by the medial axis. The inner surface preferably defines a first sealing lip and a second sealing lip. The first and second sealing lips are preferably disposed about the medial axis so as to define a first transition portion of the inner surface extending between the first sealing lip and the medial axis and a second transition portion between the second sealing lip and the medial axis. The first and second transition portions extend in the direction from the sealing lip towards the medial axis and the peripheral wall so each preferably defines a positive slope. More preferably, the inner surface of the gasket defines a central leg extending along the medial axis. Moreover, the transition portions provide for decreases in the thickness of the gasket body in direction from the lateral sides to the medial axis or central leg.

Another preferred gasket is provided which includes a first lateral side, a second lateral side spaced from the first lateral side so as to define a medial axis therebetween. The gasket includes a peripheral surface and an inner surface, each of which extend between the first and second lateral surfaces so as to be bisected by the medial axis. The peripheral surface preferably defines a profile having a pair of radiused end portion disposed about the medial axis with a central portion extending between the two radiused end portions, the radiused end portions defining the maximum diameter of the gasket. In one embodiment, the central portion defines an arcuate profile that intersects the medial axis. Alternatively, the central portion profile is substantially linear. In another preferred embodiment, the inner surface of the gasket defines a first sealing lip and a second sealing lip, the first and second sealing lips being disposed about the medial axis, the inner surface including a transition portion extending in the direction from one of the first and second sealing lips towards the medial axis and the peripheral wall so as to define a positive slope.

A preferred housing for use in a preferred coupling arrangement includes a first lateral side for receiving a first pipe segment and a second lateral side for receiving a second pipe segment. The second lateral side is spaced from the first lateral side to define a medial axis of the housing. The housing includes an inner surface defining a cavity for engaging the gasket and extends between the first lateral side and the second lateral side so as to define an inner diameter profile which decreases in a direction from the lateral side to the medial axis to define a point of contact diameter that engages the gasket. A preferred gasket disposed in the cavity of the housing has a diameter that is greater than the point of contact diameter. In one preferred embodiment, the inner surface defines a medial diameter of the housing which is no greater than the point of contact diameter.

In one preferred embodiment of the housing, the inner surface includes a sidewall portion; a backwall portion; and a transition portion between the sidewall portion and the backwall portion. The transition portion preferably defines a negative slope in the direction from the one lateral side to the medial axis and includes a first radiused portion, a second radiused portion with a straight line segment extending between the first and second radiused portions. The straight line segment defining the preferred negative slope.

A preferred method of sealing a pipe joint is provided and includes radially compressing a tapered inner surface of a housing component on a gasket disposed within a cavity defined by the inner surface. The gasket has a medial axis, a flex point, and a linear segment between the flex point and the medial axis. The linear segment preferably defines a positive slope in the direction toward the medial axis. The preferred method further includes locating a notch defined by the tapered surface between the medial axis and the flex point a lower point such that the compressing moves a lateral portion of the gasket against a sidewall of the housing.

Another preferred coupling includes a gasket and a housing having a first lateral side and a second lateral side spaced from the first lateral side to define a medial axis of the housing. The housing includes an inner surface which defines a cavity for engaging the gasket and extends between the first lateral side and the second lateral side so as to define an inner diameter profile which decreases for at least a portion between at least one of the lateral sides and the medial axis. The inner surface includes a sidewall portion, a backwall portion, and a transition portion between the sidewall portion and the backwall portion. The transition portion preferably defines a negative slope in the direction from the one lateral side to the medial axis, and includes a first radiused portion, a second radiused portion with a straight line segment extending between the first and second radiused portions. The straight line segment defines the negative slope with the first radiused portion having a center of curvature disposed on one side of the straight line, the second radiused portion having a center of curvature disposed on the other side of the straight line, the first radiused portion defining a first cavity depth of the housing and the second radiused portion defining a second cavity depth less than the first cavity depth, the backwall portion defining a third cavity depth being equal to the second cavity depth. A preferred gasket includes a first lateral side and a second lateral side spaced from the first lateral side so as to define a gasket medial axis. The preferred gasket further includes an exterior surface and an inner surface, which extends between the first and second lateral surfaces so as to be bisected by the medial axis. The inner surface defines a first sealing lip and a second sealing lip, the first and second sealing lips being disposed about the medial axis. The inner surface includes a transition portion extending in the direction from the sealing lip towards the medial axis and the peripheral wall so as to preferably define a positive slope. The exterior surface defines a profile including a pair of enlarged end portions disposed about the gasket medial axis of the gasket with a central portion disposed therebetween. The central portion is preferably radially inward of the enlarged end portions to engage the backwall portion of the housing.

BRIEF DESCRIPTIONS OF THE DRAWINGS

The accompanying drawings, which are incorporated herein and constitute part of this specification, illustrate exemplary embodiments of the invention, and, together with the description given above, serve to explain the features of the invention.

FIG. 2A-2B.

DETAILED DESCRIPTION

Figure 1A:
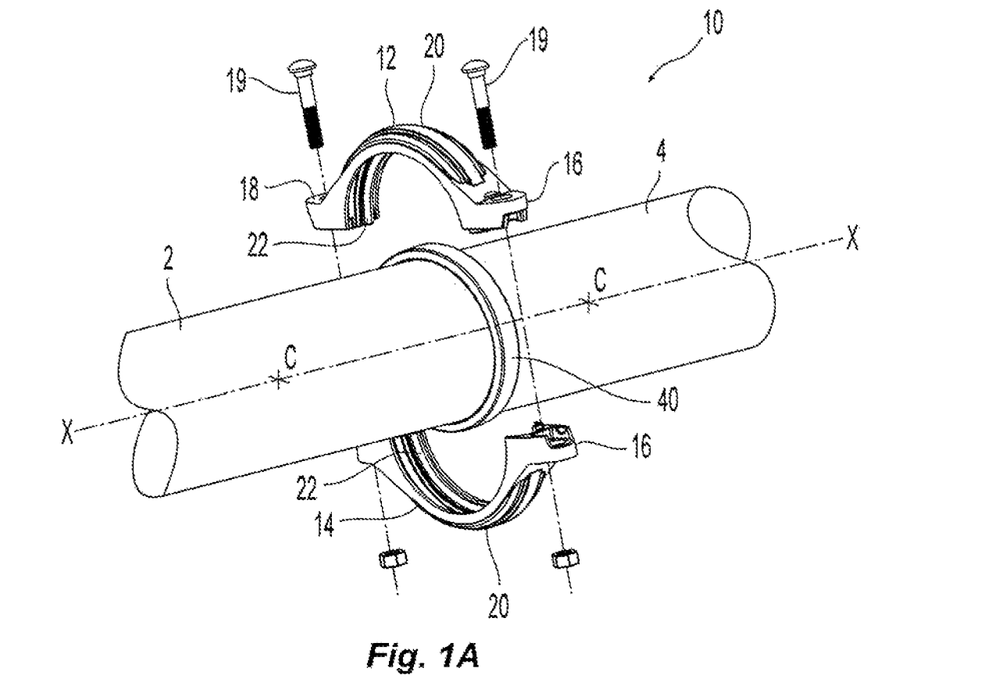
FIG. 1A is a perspective schematic of a preferred coupling arrangement.
Figure 1B:
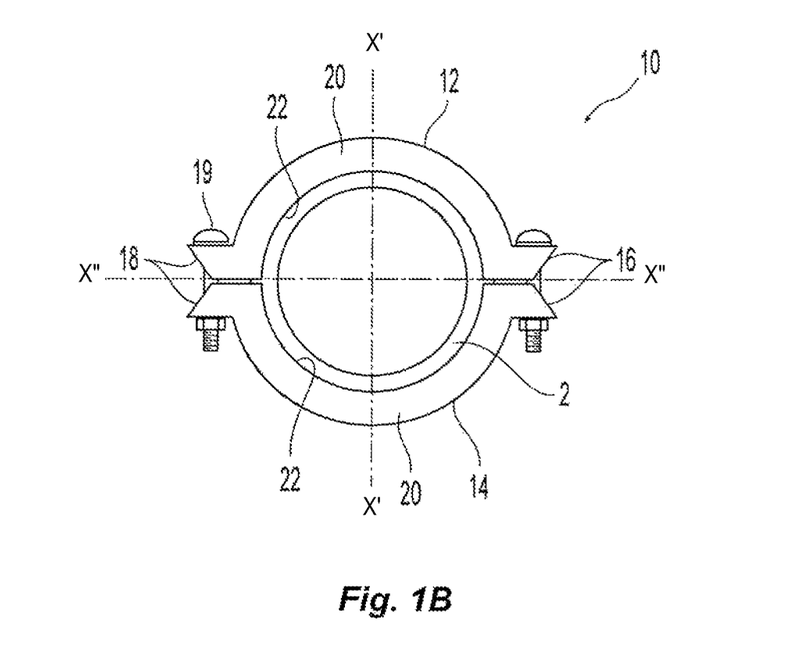
FIG. 1B is an end view of the coupling arrangement of FIG. 1A.
Figure 2A:
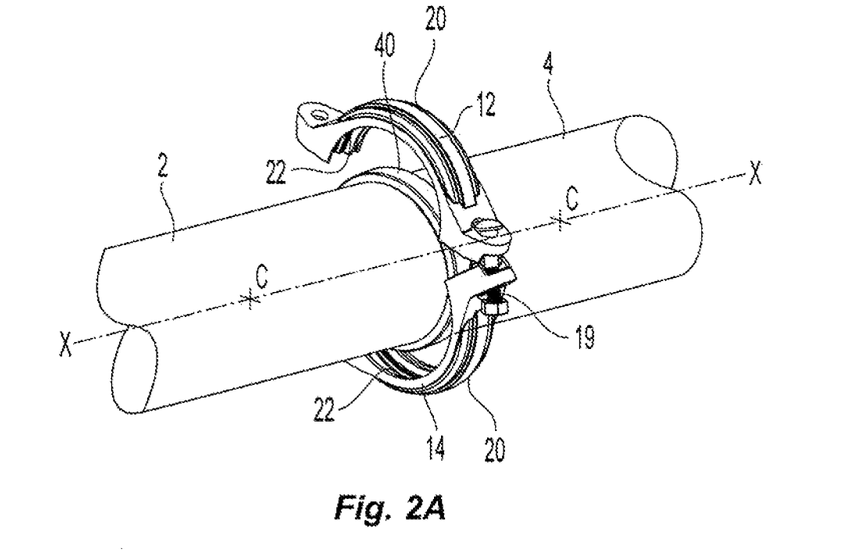
FIG. 2A is a perspective schematic of another preferred coupling arrangement.
Figure 2B:
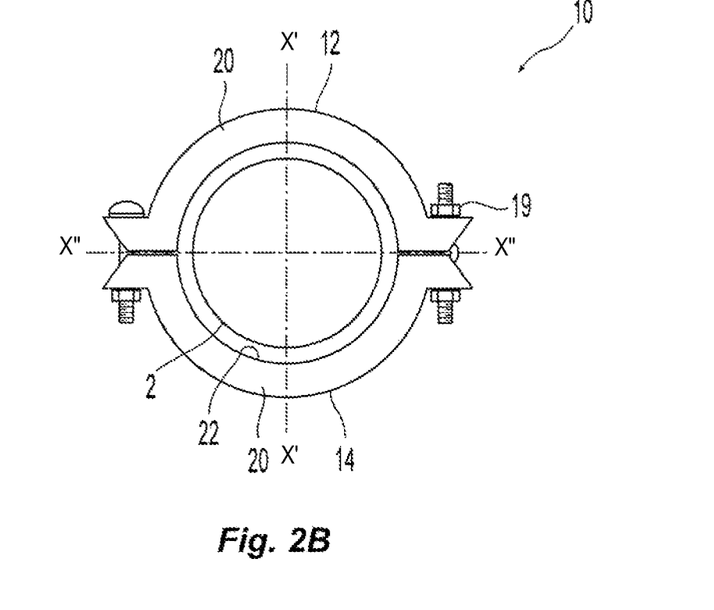
FIG. 2B is an end view of the coupling arrangement of FIG. 2A.

Shown in FIGS. 1A and 1B and FIGS. 2A and 2B, is the formation of a preferred pipe or tube joint assembly using a preferred coupling arrangement 10. In the preferred joint assembly, the pipe or tube end segments 2, 4 are axially aligned along a pipe axis X-X and a gasket 40 is disposed about the end segments 2, 4. The pipe or tubing may be copper, steel or other tubular material for forming a joint assembly. A preferred coupling housing having at least two housing components 12, 14 are engaged about the gasket 40. The housing components may be separate components as seen in FIG. 1A or alternatively may be pre-assembled in a coupled arrangement, for example in the hinge-type arrangement shown in FIGS. 2A and 2B. One preferred hinged coupling for use in the coupling arrangement is shown and described in U.S. Provisional Application No. 61/255,351, filed on Oct. 27, 2009, entitled, "Systems and Methods for Hinge Couplings," and which is incorporated by reference in its entirety. The housing components may be identical in structure so as to mirror one another about X-X, X'-X', X"-X" or alternatively may be configured differently, so long as they are configured to engage or align with one another and form the complete coupling housing about the gasket 40. Moreover the coupling housing can be formed by more than two components provided the components can be coupled together to effectively engage the gasket 40 to form the pipe joint as seen, for example, in U.S. Patent No. 6,139,069 which is incorporated by reference in its entirety.

Generally, each of the housing components 12, 14 have a first end 16, a second end 18 with a preferably arcuate pipe engaging segments 20 extending between the first and second ends 16, 18 for engagement with the gasket 40. Depending on the number of components forming the housing, the segments can be semi-circular, quarter-circle or define another arc-length. The ends 16, 18 are preferably configured as bolt pad extensions having through holes in which fasteners 19 are disposed to secure and/or couple the housing components 12, 14 to one another. The arcuate pipe engaging segments 20 further include an inner surface 22 that defines a gasket cavity 24 for engaging and housing the gasket 40.

In order to complete the formation of the pipe joint, the housing components 12, 14 are disposed over the gasket 40. To form the fluid tight seal, the fasteners are tightened so as to draw the housings 12, 14 together. As the components 12, 14 are drawn together, the inner surface 22 of the components compress the gasket 40 to form a fluid tight seal. The completed assembly defines the central axis C-C of the coupling arrangement 10, which is co-axially aligned with the pipe axis X-X.

Figure 3A:
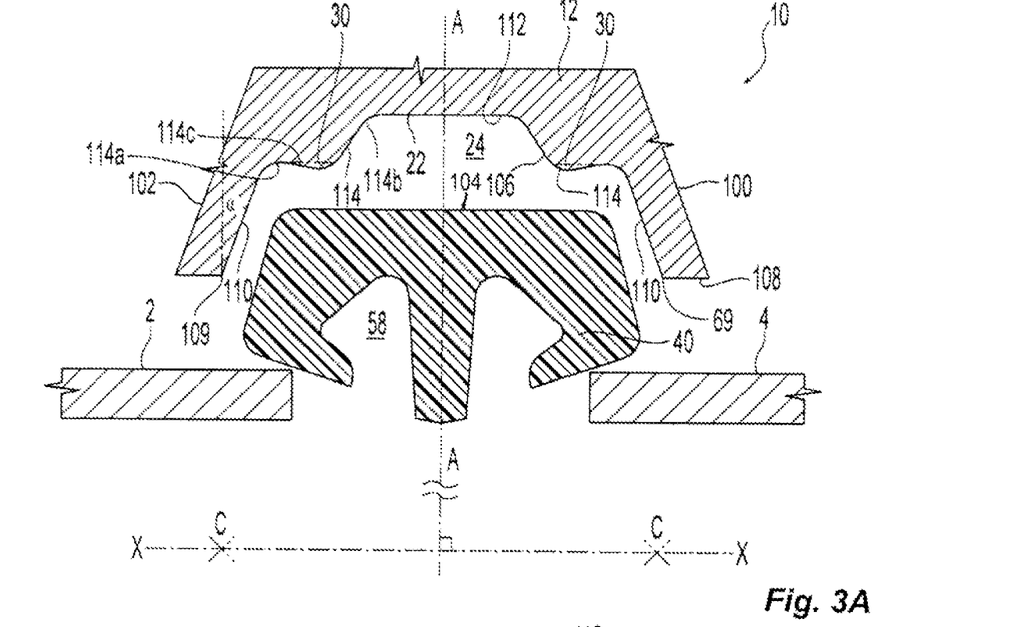
FIG. 3A is a partial cross-sectional view of a preferred coupling arrangement in an uncompressed configuration.
Figure 3B:
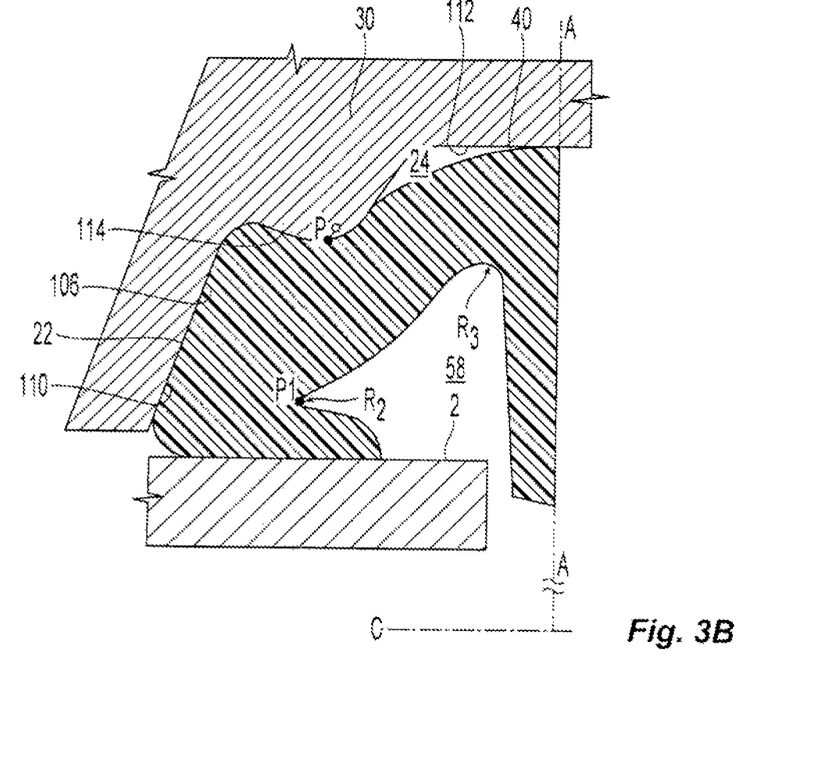
FIG. 3B is the coupling arrangement of FIG. 3A in a compressed configuration.

Respectively shown in FIG. 3A and FIG. 3B are uncompressed and compressed views of the preferred pipe joint assembly to illustrate the surface contact engagement between the inner surface 22 of the housing component 12 and the gasket 40. Preferably, the coupling arrangement 10 is symmetrical about a medial axis A-A that extends perpendicularly to the central axis C-C of the coupling 10. Alternatively, the arrangement can be asymmetrical, for example, as is the case of a reduced pipe joint arrangement. The preferred housing 12 and its inner surface 22 define a preferred surface profile 106. The surface profile 106 preferably includes a portion that tapers inwardly toward the medial axis A-A to define a decreasing inner diameter and form one or more notches 30 disposed about the medial axis A-A. Notches 30 can alternatively be defined by triangles formed on the inner surface 22 about medial axis A-A in which the vertices extend radially inward into the cavity 24. Referring to the compressed view of FIG. 3B, the inner surface 22 and its profile 106 engage the peripheral surface of the gasket 40 applying a radial compressive force. The notch 30 and its tapering surface include a point P0 that defines an interior diameter of the inner tapering surface 22 that is smaller than the diameter of the gasket 40 at the location where the point P0 makes contact. Accordingly, in forming a fluid tight seal in the pipe joint with the coupling arrangement 10, the notch 30 deforms the gasket 40 at the point P0 of contact preferably radially toward the axis C-C. Due to an interior channel 58 of the gasket 40, the lateral portion of the gasket 40 folds at a point P1 along the profile of the channel 58 to form the sealed engagement with the outer surface of the pipe segment 2, 4 and the lateral portion of the gasket 40 moves laterally against the inner surface 22 of the housing 12. Internal fluid pressure in the pipe joint can move a central portion of the gasket 40 radially outward to contact the inner surface 22 of the housing at the deepest part of the gasket cavity 24 to further stabilize the position of the gasket 40 within the cavity 24. For the preferred coupling arrangement 10, the formation of the notch 30 preferably locates the contact point P0 medially inward of the flex point P1 of the gasket relative to the medial axis A-A such that the contact point P0 is medial of the flex point P1. Moreover, the point P0 is preferably located so as not to minimize or negate the ability of the internal fluid pressure to move the gasket radially outward against the coupling housing.

FIG. 3A shows a cross-sectional general view of the preferred housing component 12 having a first lateral side 100 and a second lateral side 102 which define therebetween the medial axis A-A of the housing component 12. Extending between the first and second lateral sides is the body of the component 12 which includes a peripheral surface profile 104 (seen in FIGS. 4A and 4B as 104' and 104") and a preferred inner surface profile 106 of the inner surface 22. The inner surface 106 preferably includes to each side of the medial axis A-A, a pipe engagement portion 108 (shown in FIGS. 4A and 4B as 108' and 108"), a sidewall portion 110, a backwall portion 112, and a transition portion 114 extending between the sidewall and backwall portions 110, 112. The pipe engagement portion 108 directly engages the outer surface of the pipe segment in the pipe joint assembly and preferably extends substantially linearly parallel to the central axis C-C of the coupling arrangement 10. The sidewall portion 110 is contiguous with the pipe engagement portion 108 to define a surface for engagement with the sidewall of the gasket 40 in the joint assembly. The sidewall portion 110 is also preferably substantially linear defining a preferably obtuse angle α with line parallel to the medial axis A-A. More preferably formed between the pipe engagement portion 108 and the sidewall portion 110 is a surface transition 109, which can either be radiused defining a radius of curvature or more preferably defines a step transition between the pipe engagement portion 108 and the sidewall portion 110.

The backwall portion 112 of the inner surface profile 106 preferably defines the portion of the housing inner surface 22 which supports a medial portion of the gasket 40 and more preferably define the deepest portion of the gasket cavity 24. Alternatively, backwall 112 can be located at a depth equivalent to the contact point P0 of the notch 30, or at a depth shallower than P0 but deeper than point P1 of the gasket. In the preferred embodiment 12, the back wall portion 112 of the inner surface 106 profile is substantially linear or planar extending in a direction parallel to the central axis C-C of the coupling 10. Alternatively, the backwall portion 112 can be a single deepest point of contact of the inner surface 104 for engagement with the gasket 40. Further in the alternative, the backwall portion 112 can define a segment of the inner surface 106 that defines multiple points of contact for the gasket 40, in which the multiple points of contact define the deepest point of the gasket cavity which engage the gasket 40.

Contiguously extending between the backwall portion 112 and the sidewall portion 110 of the inner surface profile 106 is the transition portion 114. The transition portion 114 preferably includes a first radiused end 114a which defines a radius of curvature contiguous with the sidewall portion 110, and a second radiused end 114b which defines a radius of curvature contiguous with the backwall portion 112. Alternatively the ends 114a, 114b can be more of a step type transition. Between the ends 114a, 114b the transition portion 114 preferably defines the notch 30 of the inner surface 22 described above. Preferably, the transition portion 114 defines a segment 114c of the inner surface profile 106 having a negative slope, meaning that in the direction from a lateral side 100, 102 to the medial axis A-A, the depth of the gasket cavity 24 decreases over the length of the sloping segment 114c in the lateral to medial direction. Accordingly, the segment 114c defines a narrowing taper of the inner surface profile 106 for the coupling housing component 12 in the lateral to medial direction so as to define a decreasing inner diameter of the housing over the segment 114c. The segment 114c is preferably linear or alternatively may be defined by an undulating or other non-linear profile over its length provided the segment defines a narrowing taper in an area of the inner surface 22 of the housing component 12 that contacts the gasket 40. The transition portion 114 of the inner surface profile 106 can include a combination of linear and nonlinear segments provided that the transition portion 114 effectively defines a notch 30 as described above.

Figure 4A:
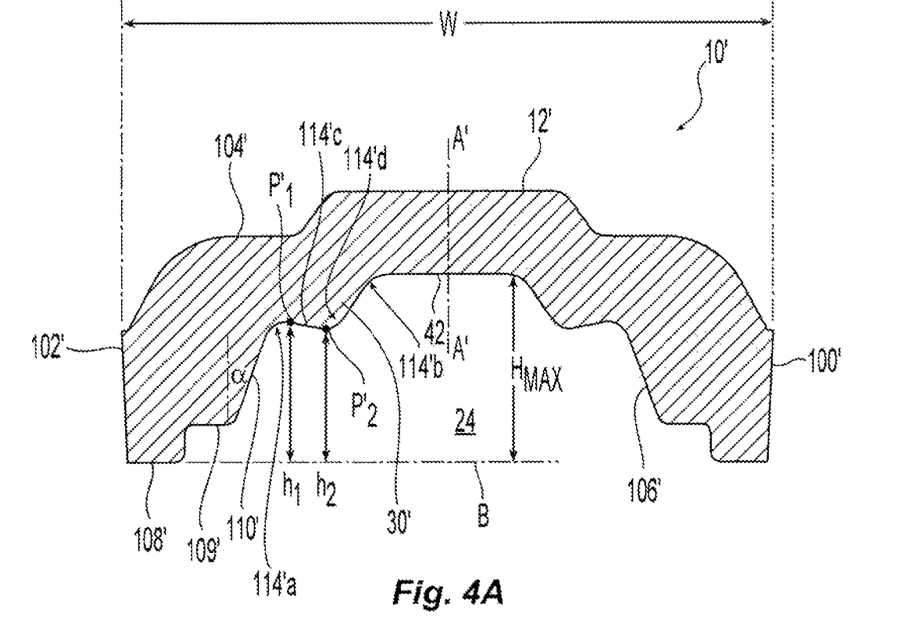
FIG. 4A is a preferred housing component for use in the arrangements of FIGS. 1A-1B and FIG. 2A-2B.

Shown in FIG. 4A is a preferred housing component 12' for a preferred nominal six inch (6 in.) coupling 10'. The component has a first lateral side 100' and a second lateral side 102' spaced apart from one another to define the medial axis A'-A' of the housing component 12'. The lateral sides 100', 102' define the width W of the coupling 10' about the medial axis A'-A' in which the width W preferably ranges from about 1.5 to about three inches and is approximately 1.8 inches. The housing component 12' includes a peripheral surface 104' which defines the outer surface of the coupling assembly 10'. The housing component 12' further includes an inner surface profile 106' to define the gasket cavity 24' for housing a gasket 40. The preferred inner surface profile 106' is symmetrical about the medial axis A'-A' and includes at its lateral end the pipe engaging surface 108'. Extending medially, the inner surface profile 106' further includes the sidewall portion 110' with a substantially step transition 109' between the pipe engagement portion 108' and the sidewall portion 110'. The sidewall segment 110' is preferably linear with a positive slope such that the depth of gasket cavity 24 increases in the lateral to medial direction over the length of the sidewall segment 110'. The sidewall segment further preferably defines a preferred angle α' about twenty degrees (20°) with respect to a line parallel to the medial axis A'-A'. The sidewall segments 110' are spaced about the medial axis A'-A' to accommodate the thickness of the gasket 40.

The backwall portion of the inner surface profile 106' of the housing component 12' preferably defines the deepest depth Hmax of the gasket cavity 24', which is preferably about one-half inch (0.5 inch.) from a baseline B located in the plane of the pipe engagements surfaces 108'. In the complete coupling assembly 10, the backwall portion 112 defines the maximum inner diameter of the coupling 10' which is preferably about seven inches (7 in.). The backwall portion 112 is preferably linear extending parallel to the coupling axis C-C to define the minimum width of the cavity 24.

Extending between the sidewall portion 110' and the backwall portion 112' is the transition portion 114'. The transition portion 114' preferably includes a first radiused portion 114'a contiguous with the sidewall portion 110' and a second radiused portion 114'b contiguous with the backwall portion 112'. The transition portion 114' includes a preferably linear segment 114'c that defines a narrowly tapering portion of the inner surface 22' in the lateral to medial direction between points P'1 and P'2 to define a notch 30' and a decreasing inner diameter over the segment 114c'. Point P'1 is preferably located at the end of the sidewall portion 110' and the concavely radiused portion 114'a having a preferred radius of curvature of under 0.1 inch and preferably about 0.06 inch. Point P2 is located at the end of the linear segment 114'c and contiguous with a convexly radiused portion 114'd having a radius of curvature of under 0.1 inch and preferably about 0.06 inch. Moreover P1 is preferably located at a cavity depth h1 measured from the baseline B, and P2 is preferably located at a cavity depth h2 from the baseline B in which h2 is less than h1.

Figure 4B:
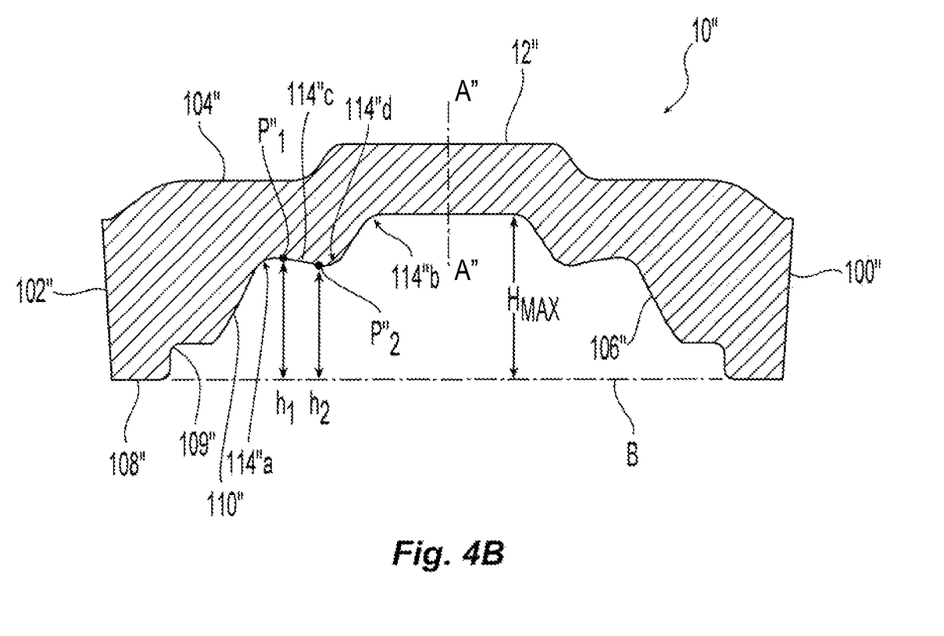
FIG. 4B is another preferred housing component for use in the arrangements of FIG. S1A-1B.

Shown in FIG. 4B is a preferred housing component 12" for a preferred nominal two inch (2 in.) coupling 10". The component has a first lateral side 100" and a second lateral side 102" spaced apart from one another to define the medial axis A"-A" of the housing component 12". The lateral sides 100", 102" define the width W" of the coupling 10" about the medial axis A"-A" in which the width W" preferably ranges from about 1.5 to about 2 inch and is approximately 1.8 inch. The housing component 12" includes a peripheral surface 104" which defines the outer surface of the coupling assembly 10". The housing component 12" further includes an inner surface 106" to define a gasket cavity 24" for housing a gasket 40. The preferred inner surface 106" is symmetrical about the medial axis A"-A" and includes at the lateral side the pipe engaging surface 108". Extending medially, the inner surface 106" further includes the sidewall portion 110" with a substantially step transition 109" between the pipe engagement portion 108" and the sidewall portion 110". The sidewall portion 110" generally defines a positive slope such that the depth of the gasket cavity 24" increases in the lateral to medial direction over the length of the sidewall segment 110' to define a preferred angle α' about thirty degrees and preferably about twenty-seven degrees (27°) with respect to a line parallel to the medial axis A"-A". The sidewall segments 110" are spaced about the medial axis A"-A" to accommodate the thickness of the gasket 40.

The backwall portion of the inner surface 106" of the housing component 12' defines the deepest depth Hmax' of the gasket cavity, which is preferably about 0.5 inch from a baseline B" that is located in the plane of the pipe engagements surfaces 108". In the complete coupling assembly 10", the backwall portion 112" defines the maximum inner diameter of the coupling 10" which is preferably about three inches. The backwall portion 112 is preferably linear having a length extending parallel to the coupling axis C-C to define a minimum width of cavity 24. Extending between the sidewall portion 110" and the backwall portion 112" is the transition portion 114". The transition portion 114" preferably includes a first radiused portion 114"a contiguous with the sidewall portion 110" and a second radiused portion 114"b contiguous with the backwall portion 112".

The transition portion 114" includes a preferably linear segment 114"c having a negative slope that defines a narrowly tapering portion of the inner surface 106" in the lateral to medial direction between points P"1 and P"2 to define notch 30" and a decreasing inner diameter over the segment 114c". Point P"1 is preferably located at the end of the sidewall portion 110' and the concavely radiused portion 114"a having a preferred radius of curvature of under 0.1 inch and preferably about 0.06 inch. Point P2 is located at the end of segment 114'c contiguous with a convexly radiused portion 114'd having a preferred radius of curvature of under 0.1 inch and preferably about 0.06 inch. Moreover P"1 is preferably located at a cavity depth h1 measured from the baseline B", and P"2 is preferably located at a cavity depth h2 from the baseline B" in which h2 is less than h1.

As previously noted, the notches 30 defined along the inner surfaces of the housing components or segment 12 described above are configured to apply a radially inward compressive force against the gasket 40 to improve and/or maintain the fluid tight seal of the gasket 40. In particular, the notches 30 define a tapered or wedge surface along the inner surface 22 of the coupling housing component 12 to apply a force to the peripheral surface of the gasket in a direction radially inward toward the central axis of the coupling C-C and laterally outward toward the sidewall portions 110 of the housing 12. Gaskets 40 preferably for use with the coupling housings described herein are annular or ring-type bodies defining a gasket center axis G-G for alignment with central axis of the coupling C-C.

Figure 5A:
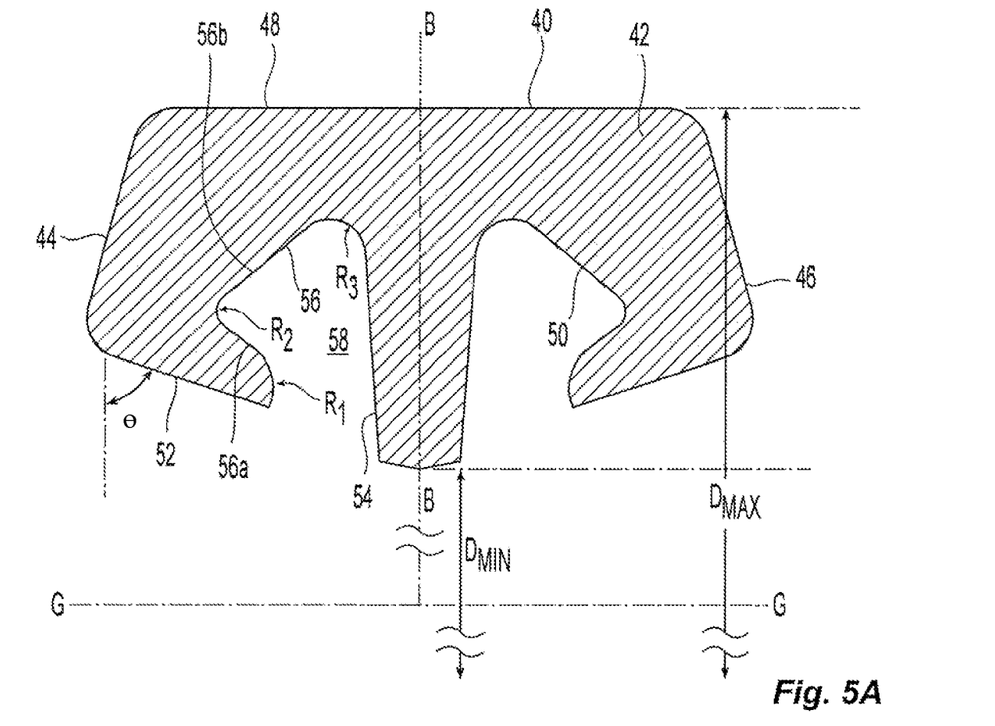
FIG. 5A is a preferred gasket for use with the housing component FIG. 4A.

Shown in FIG. 5A is a preferred nominal six inch (6 in.) gasket 40 for use with the preferred nominal six inch coupling 10' of FIG. 4A. The gasket annular body 42 has a first sidewall 44 for receiving the first pipe segment 2, a second sidewall 46 for receiving the second pipe segment 4. The second sidewall 46 is spaced from the first sidewall 44 to define a medial axis B-B therebetween that extends perpendicular to the gasket central axis G-G. The annular body 42 includes an outer peripheral surface 48 and an inner surface 50 radially spaced from the gasket center axis G-G. Each of the peripheral and inner surfaces 48, 50 are preferably symmetrical about the gasket medial axis B-B and are moreover, preferably contiguous with the sidewalls 44, 46 of the gasket having a radiused corner defining the transition between the sidewalls 44, 46 and the peripheral and inner surfaces 48, 50 of the gasket.

In cross-section, the inner surface 50 defines a pair of sealing lip surfaces 52 that are disposed preferably equilaterally about the medial axis B-B. The sealing lip surfaces 52 directly engage the outer surface of the pipe segments to form a fluid tight seal upon application of a sufficient compressive force about the gasket 40. The sealing lips 52 define a profile that, in the uncompressed state of the gasket 40, defines an angle θ with a line parallel to the medial axis B-B the profile sealing lips can include linear portions, radiused portions and/or combination thereof. Preferably formed with and depending from the inner surface 50 along the medial axis is a central leg portion 54. The central leg acts as a buffer and divider between the ends of the pipe segments being joined together, as seen for example, in FIG. 3A and 3B. The profile of the preferred central leg 54 tapers narrowly in the axial direction along the medial axis A'-A' varying in thickness over its axial length from about 0.1 inch to about 0.2 inch.

The inner surface 50 of the preferred gasket 40' further includes a transitional segment 56 which connects the sealing lip surface 52 to the central leg 54. The transitional segment 56 defines a cavity or channel 58 between the sealing lip surface and the central leg 54. The cavity 58 defined by the transitional segment 56 provides a void into which the gasket body 42 can fold onto itself under the compressive forces of the housing components 12, 14 of the coupling 10 and the fluid pressure conveyed in the pipe segments and through the pipe joint. The transitional segment 56 preferably includes a combination of radiused portions and linear portions to connect the sealing lip surface 52 to the central leg 54.

In the preferred embodiment of FIG. 5A, the transitional segment 56 includes a first portion 56a that preferably initiates with a first convexly radiused portion R1 that is contiguous with a linear segment that extends laterally toward the sidewall 44, 46 and peripherally toward the peripheral surface 48 to a second radiused portion R2 about which the gasket body 42 folds. The transitional segment 56 further preferably includes a second portion 56b which is preferably initially a line segment contiguous with the second radiused portion R2 and extends medially toward the medial axis A-A and toward the peripheral surface 48 of the gasket to a preferably third radiused portion R3 contiguous with the central leg 54. The preferred geometric profile and in particular the positively sloping segment 56 provide for a desirable gasket channel 58 in which the depth of the channel 58, as measured from a line parallel to the gasket center axis G-G, increases in the lateral to medial direction. Accordingly, the body 42 of the gasket 40 decreases in its radial thickness for at a portion of the body 42 over the lateral to medial direction.

For the preferred gasket 40 of FIG. 5A the angled sidewall surfaces 44, 46 are spaced apart to define a gasket thickness which ranges from a minimum thickness at the peripheral surface of about 0.9 inch to a maximum thickness of the entire gasket 40 of about 1.1 inches. The preferred gaskets are preferably dimensioned to slip on the ends of the pipe segments with at least a portion of the sealing lip surface 52 forming a surface contact with the outer surface of the pipe segments and the central leg 54 engaging the end surface of the pipe segment. For a nominal 6 inch pipe segment, the peripheral surface 48 defines a preferred outer diameter Dmax for the gasket 40 to be about seven inches. The central leg 54 defines a preferred minimum interior diameter Dmin of the gasket of about 5.75 inches, and the sealing lips 52 define a preferred diameter D at its most medial end of about six inches. The width of the central leg 54 preferably tapers in the radial direction toward gasket axis G-G.

For the preferred inner surface 50 of the nominal 6 inch gasket, the third radiused portion R3 includes a preferred radius of 0.06 inch and is located medially closer to axis B-B than R2. The second radiused portion R2 includes a preferred radius of about 0.03 inch and is located closer to the gasket axis G-G than the R3.

Figure 5B:
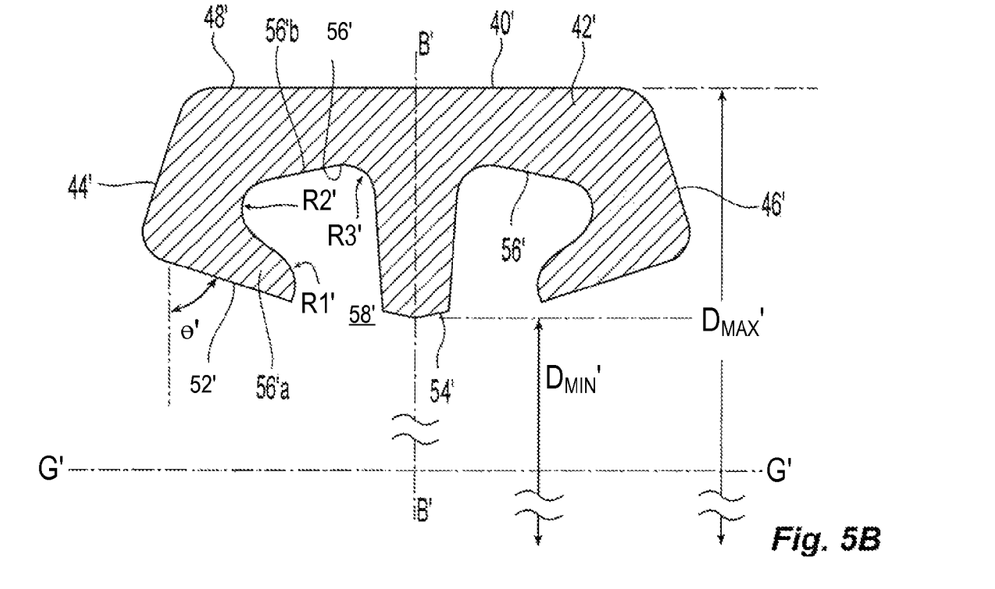
FIG. 5B is a preferred gasket for use with the housing component FIG. 4B.

Shown in FIG. 5B is another preferred gasket 40', which incorporate similar features of the previous embodiment, but is preferably dimensioned and configured for nominal two inch (2 in.) pipe segments. In particular, the peripheral surface of the gasket 40' defines a diameter Dmax of about three inches, the central leg 54 defines a preferred minimum interior diameter Dmin of the gasket of slightly under two inches with the sealing lips 52 defining a preferred diameter D at their most medial end of about two inches. For the preferred inner surface 50' of the nominal 6 inch gasket, the third radiused portion R3' includes a preferred radius of 0.06 inch and is located medially closer to axis B'-B' than R2'. The second radiused portion R2' includes a preferred radius of under 0.1 inch and is located closer to the gasket axis G-G than the R3'.

Referring again to FIG. 3B and the compressed state of the preferred coupling arrangements 10, the low point P0 of the notch 30 of the housing component is located medially inward of the a point P1 on the preferred second radius R2 of the gasket 40 about which the gasket folds. This preferred configuration provides for a surface contact between the inner surface 22 of the housing component 12 and the peripheral surface 48 of the gasket 40 which provides for a force having a horizontal component in the lateral direction to improve or maintain the contact between the sidewall portion 110 portion of the housing component 12 and the sidewall 44, 46 of the gasket 40 in order to maintain or increase the sealed engagement between the gasket and the outer surface of the pipe segments.

Figure 5C:
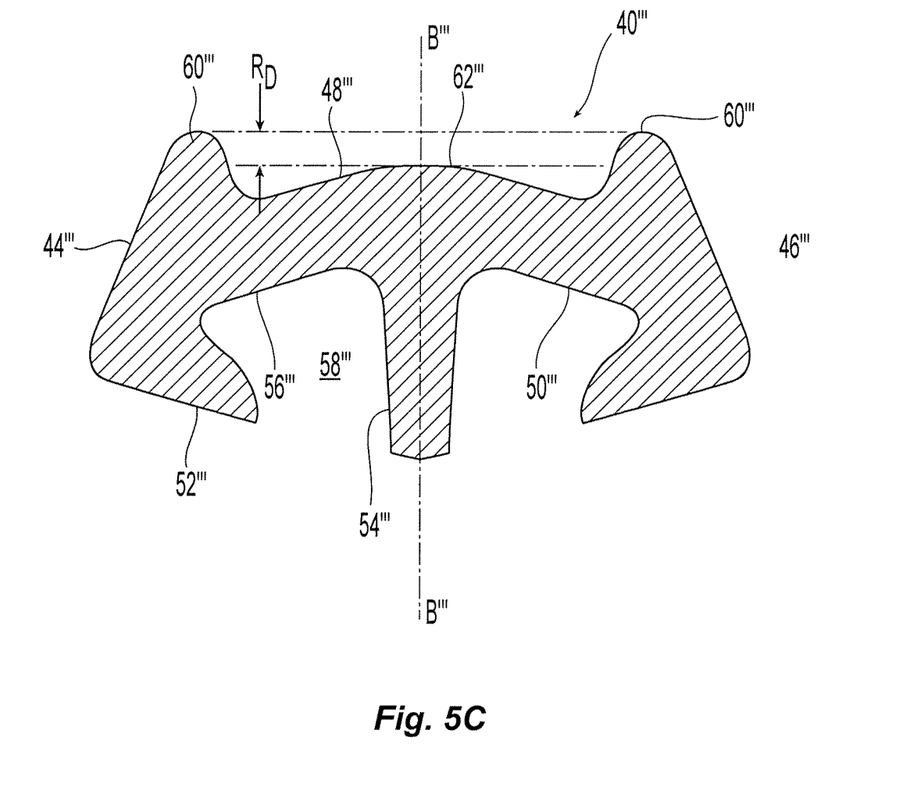
FIG. 5C is another preferred gasket for use with the arrangement of FIGS. 3A-3B.

For each of the preferred gaskets 40', 40", the peripheral surface 48 defines a profile that is substantially planar extending parallel to the central axis G-G of the gasket. In another alternative embodiment of the gasket 40'", shown in FIG. 5C, the peripheral surface 48'" defines a profile that is non linear. In particular, the peripheral surface 48'" preferably defines a profile that is symmetrical about the medial axis of the gasket B'"-B'" with two enlarged end portions 60'" and a central portion 62'" located radially inward of the radiused end portions 60'". In the embodiment of FIG. 5C the central portion 62'" is preferably arcuate and symmetrical about the medial axis B'"-B'". The end portions 60'" provide a transition profile between the gasket sidewalls 44'", 46'" and the central portion 62'" of the peripheral surface. The profile of the end portion 60'" can be defined by radiused segments, substantially linear segments or a combination of both. The surfaces of the end portions 60'" alone or in combination with the central portion 62'" define a surface of the gasket that can engage the preferred tapered surface of the notch 30 in the coupling housing components described herein to provide a normal force directed laterally in the direction of the sidewall portion of the gasket housing. The diameter of the gasket 40'" preferably varies from one lateral side of the gasket to the next. Preferably, the radiused end portions 60'" define a greater diameter of the gasket 40'" than the central portion 62'", and more preferably the end portions 60'" define the maximum diameter of the gasket 40'" with the center of the arcuate portion 62'" defining a percentage of the maximum gasket diameter ranging from about 90 percent to about 99 percent (90-99%). Accordingly, the gasket diameters defined at the end portions 60'" and central portion 62'" can define between one another a percent differential in the gasket diameter profile that ranges between one to about ten percent (1-10%). Alternatively, each of the end portions 60'" and central portion '" can define a perpendicular to the medial axis B'"-B'" that further defines a radial differential $R_D$ along the medial axis B'"-B'" that can be about 0.1 inch or less.

Figure 6A:
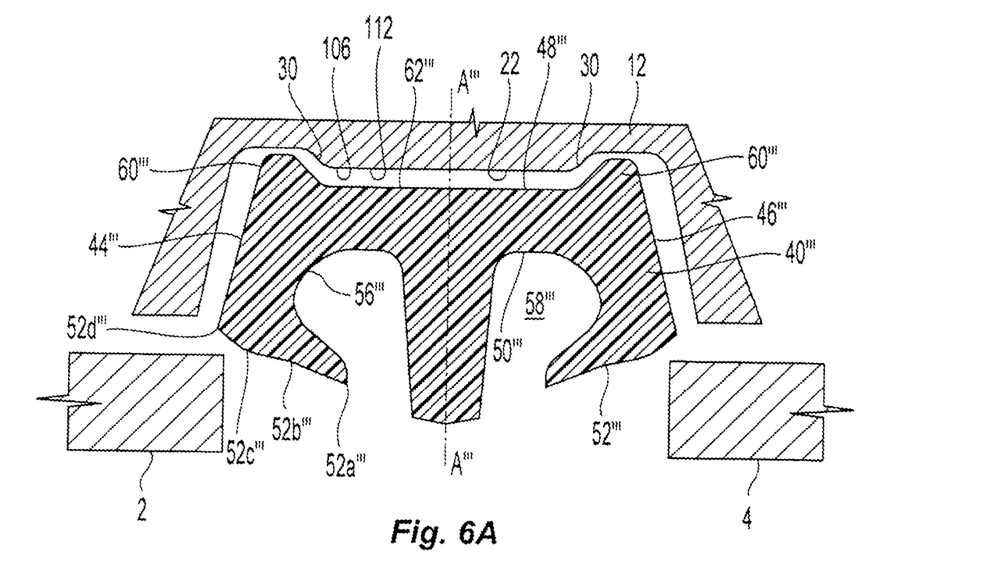
FIG. 6A is a partial cross-sectional view of another embodiment of a coupling arrangement.
Figure 6B:
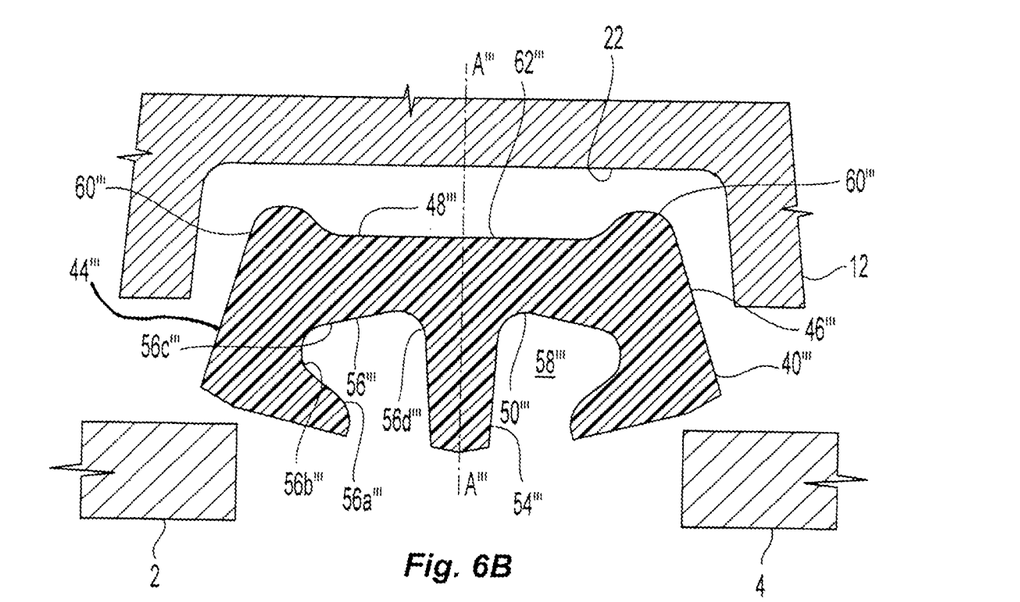
FIG. 6B is a partial cross-sectional view of another embodiment of a coupling arrangement.

In view of the above descriptions of both the preferred gaskets and housings, alternative pipe coupling arrangements are possible. For example, as shown in FIGS. 6A and 6B are schematic cross-sectional illustrations of pipe coupling arrangements that use an alternate embodiment of the gasket 40'". More specifically, shown in FIG. 6A is an alternate embodiment of the gasket 40'", the peripheral surface 48'" defines a profile having two enlarged end portions 60'" with a substantially linear central portion 62'" therebetween that runs substantially parallel to the gasket axis G-G and/or central axis of the coupling C-C. In the arrangement of FIG. 6A, a housing 12 is provided having an inner surface 22 with a profile 106 that substantially mirrors the peripheral surface 48'" in a substantially dovetail fashion. More specifically, the inner surface 22 has an inner surface profile 106 in which the backwall portion 112 is preferably at the same cavity depth and contiguously formed with the notches 30 so as to define a centralized surface that engages the substantially central linear portion 62'" of the gasket 40'" in the assembled coupling arrangement. The backwall portion 112 preferably engages the central linear portion 62'" substantially along its length. The inner surface profile 106 results in a pair of lateral recesses symmetrically disposed about the backwall portion 112 for housing the radiused end portions 60'". In the embodiment of FIG. 6A, the notches 30 parallel and/or engage the substantially linear surface segments of the end portions 60'" so as to provide the force in the lateral direction toward the sidewalls of the housing segment 12.

The preferred gaskets 40, 40', 40'" described herein can be used with housing components that do not include notches 30. Accordingly, the preferred gaskets 40, 40', 40'" can be used with known housings. The inventor has discovered a preferred radial differential $R_D$ range as defined between the enlarged end portions 60'" and central portion 62'" of the gasket 40'" for which a housing having a notch 30 is preferred. For a radial differential $R_D$ of greater than 0.06 inch a notch is desirable to provide the normal force having a laterally directed component. For a radial differential $R_D$ of about 0.06 inch or less, the coupling arrangement may employ a housing without a notch along the inner surface. For example, shown in FIG. 6B is the gasket 40'" with a housing 12 in which the inner surface 22 does not have a notch 30. The enlarged end portions are configured to engage the housing inner surface 22 such that in the assembled coupling configuration, the lateral walls 44'", 46'" of the gasket 40'" are directed laterally and the central portion 62'" is directed radially outward toward the backwall of the housing. In the gasket 40'", the profile of each enlarged end portion 60'" is preferably defined by a linear segment for engaging the housing backwall with preferably radiused portions on each side that are respectively contiguous with the central portion 48'" and lateral sidewall of the gasket. The enlarged end portion 60''' and central portion 48''' preferably define a radial differential $R_D$ of about 0.06 inch.

As noted above, the transitional segment 56''' along the inner surface 50''' of the gasket can include a combination of varying radiused portions and/or linear portions to connect the sealing lip surface 52 to the central leg 54. For example, the transitional segment 56''' can consist of two or more radiused segment 56*a*, 56*b*, 56*c*, 56*d* extending from the sealing lip surface 52''' to the central leg 54''' such that the channel 58" is substantially tear-dropped shaped. Alternatively, the transitional segment 56''' can include one or more linear segments as seen for example in FIGS. 6A and 6B. Moreover, the transitional segment 56''' can be configured so as to provide a desired average radial thickness of the gasket 40''' so as to maintain a desired strength or resiliency in the gasket 40'''. Accordingly, the transitional segment 56''' and channel 58''' can be configured such that the central portion 48''' and a tangential off the most radially outward portion of the channel 58''' perpendicular to the medial axis define a radial thickness of the gasket being about 0.1 inch to about 0.175 inch.

Other aspects of the gaskets may be varied, such as for example as seen in FIG. 6B, the sealing lip surface 52''' can include a combination of radiused and/or linear segments to define a series of transition points 52*a*''', 52*b*''', 52*c*''', and 52*d*'''. The transition 52*d*''' preferably defines a first inner diameter of the gasket that is greater than the nominal diameter of the pipe being joined. The transition 52*c*''' and 52*b*''' preferably define respectively, the maximum and minimum pipe diameter for the given nominal pipe diameter. The innermost transition point 52*a*''' is radially located relative to the gasket center so as to provide a sufficient seal about an outer pipe surface that may be out of round for the given nominal pipe size. The preferred coupling arrangements described herein are preferably used to couple pipe or tubing and in particular copper or steel piping. The coupling arrangements of FIGS. 6A and 6B are well suited for joining steel pipe or tubing because the preferred sealing lip surfaces can effectively address large dimensional variations that may be experienced in joining nominal sized steel piping. The preferred gaskets are preferably dimensioned to slip on the ends of the pipe segments with at least a portion of the sealing lip surface 52''' forming a surface contact with the outer surface of the pipe segments and the central leg 54''' engaging the end surface of the pipe segment. For a nominal four inch (4 in.) pipe segment, the peripheral surface 48''' defines a preferred maximum outer diameter for the gasket 40''' to be about five and a half inches and more preferably 5.4 inches. The central leg 54''' defines a preferred minimum interior diameter of the gasket of about four inches, and the sealing lips 52''' define a preferred diameter at its most medial end of about four and a half inches and more preferably 4.4 inches. The width of the central leg 54''' preferably tapers in the radial direction toward gasket axis. For the preferred gasket 40''' the angled sidewall surfaces 44''', 46''' define an average thickness of about one inch and more preferably a minimum thickness at the peripheral surface of about 0.9 inches and a maximum thickness of the gasket 40''' of about 1.2 inches.

Shown and described above are a preferred embodiments of nominal six, four and two inch coupling arrangements. The preferred arrangements can range in size from a nominal one to twelve inch (1 in.-12 in.) coupling. Known gasket configurations may be used with the preferred housing components 10 described herein. For example, as shown in FIGS. 9A and 9B of U.S. Provisional Application No. 61/255,351, standard style "C shaped" or "Tri-seal" gaskets as identified at page 12 in Tyco Fire & Suppression Products Publication IH-1000FP, entitled, "GRINNELL®-Grooved Fire Protection Installation Manual" (August 2007) can be used in the preferred coupling assemblies 10, 10'. A copy of page 12 from the installation manual is provided in U.S. Provisional Application No. 61/255,409, which is incorporated by reference in its entirety.

While the present invention has been disclosed with reference to certain embodiments, numerous modifications, alterations, and changes to the described embodiments are possible without departing from the sphere and scope of the present invention. Accordingly, it is intended that the present invention not be limited to the described embodiments, but that it has the full scope defined by the language of the following claims, and equivalents thereof.

What is claimed is:

1. A coupling comprising:
   a housing having:
   a first housing lateral side for receiving a first pipe segment;
   a second housing lateral side for receiving a second pipe segment, the second housing lateral side being spaced from the first housing lateral side to define a medial axis therebetween; and
   a housing inner surface extending between the first and second housing lateral sides to define a cavity bisected by the medial axis, the cavity defining an increasing depth from each of the housing lateral sides to the medial axis, the housing inner surface further defining a profile between each of the housing lateral sides and the medial axis, the profile including:
   a sidewall portion;
   a backwall portion; and
   a transition portion between the sidewall portion and the backwall portion, the transition portion defining a negative slope in the direction the respective housing lateral side to the medial axis, and defining a notch having a first radiused portion, a second radiused portion, and a straight line segment between the first and second radiused portions, the straight line segment defining the negative slope; and
   a gasket disposed in the housing for forming a seal about a pipe joint, the gasket including:
   a first gasket lateral side;
   a second gasket lateral side spaced from the first lateral side about the medial axis;
   a gasket exterior surface; and
   a gasket inner surface, the exterior and inner gasket surfaces extending between first and second gasket lateral surfaces sides so as to be bisected by the medial axis, the gasket inner surface defining a central leg extending along the medial axis, the gasket inner surface further defining a first sealing lip and a second sealing lip, the first and second sealing lips being disposed about the central leg so as to define a first flex point and first transition portion of the gasket inner surface extending between the first sealing lip and the central leg and a second flex point and second transition portion between the second sealing lip and the central leg, the first and second transition portions extending in a direction from a respective one of the first and second sealing lips towards the medial axis and a peripheral wall so as to define a positive slope,
   wherein in an assembled configuration, the housing engages the gasket so as to locate the notches of the housing between the flex points and the medial axis and fold the gasket about the first and second flex points such that at least one of the first and second gasket lateral sides are directed laterally against the sidewall portion of the inner surface of the housing.

2. The coupling of claim 1, wherein the first radiused portion has a center of curvature disposed on one side of the straight line segment, the second radiused portion having a center of curvature disposed on the other side of the straight line segment.

3. The coupling of claim 1, wherein the first radiused portion defines a first cavity depth of the housing and the second radiused portion defines a second cavity depth less than the first cavity depth.

4. The coupling of claim 3, wherein the backwall portion defines a third cavity depth being greater than the second cavity depth.

5. The coupling of claim 3, wherein the backwall portion defines a third cavity depth being equal to the second cavity depth.

6. The coupling of claim 1, wherein the backwall portion is substantially linear extending substantially parallel to the central coupling axis.

7. A method of sealing a pipe joint connecting axial ends of opposing pipe sections, the method comprising:
   providing a substantially annular housing having a radially inner surface defining an inner cavity, the inner cavity bounded axially by opposing side walls;
   providing a gasket within the cavity, the gasket having radially exterior and interior surfaces, and a medial axis bisecting the gasket into opposing lateral portions, the interior surface of each lateral portion comprising:
   a flex point,
   a sealing lip extending from the flex point and engaging an axial end of one of the pipe sections, and
   a segment extending from the flex point toward the medial axis to define a positive slope therebetween;
   radially compressing the housing against the gasket such that at least one of (1) radially protruding portions of the inner surface of the housing engage the exterior surface of the gasket between the medial axis and each flex point, and (2) the inner surface of the housing engages end portions of the exterior surface of the gasket, to thereby fold the sealing lips about the flex points and deform the lateral sides of the gasket against the sidewalls of the housing.

8. The method of claim 7, wherein the step of compressing the housing further comprises deforming a central portion of the exterior surface of the gasket toward a back wall of the radially inner surface of the housing.

9. A pipe coupling comprising:
   a housing having
   a first lateral side for receiving a first pipe segment;
   a second lateral side for receiving a second pipe segment, the second lateral side being spaced from the first lateral side to define a medial axis of the housing; and
   an inner surface defining a cavity, the inner surface extending between the first lateral side and the second lateral side so as to be bisected by the medial axis and define an increasing depth of the cavity from the lateral side to the medial axis, the inner surface having a sidewall portion and a backwall portion; and
   a gasket including:
   a first lateral side and
   a second lateral side spaced from the first lateral side;
   a peripheral surface and an inner surface, the peripheral and inner surfaces extending between the first and second lateral surfaces, the gasket being disposed in the housing such that the peripheral and inner surfaces are bisected by the medial axis of the housing, the inner surface defining a first sealing lip and a second sealing lip, the first and second sealing lips being disposed about the medial axis, the inner surface including a flex point and a transition segment, the flex point being located between one of the first and second lips and the transition segment, the transition segment extending in the direction from one of the first and second sealing lips towards the medial axis and the peripheral wall so as to define a positive slope, the peripheral surface defining a profile having a pair of end portions disposed about the medial axis with a central portion extending between the two end portions, the end portions defining the maximum diameter of the gasket,
   wherein in an assembled configuration, the inner surface of the housing engages the end portions to compress the gasket so as to fold the gasket about the flex point and direct at least one of the first and second lateral sides of the gasket laterally against the sidewall portion of the inner surface of the housing.

10. The coupling of claim 9, wherein in the assembled configuration the central portion of the peripheral surface is directed outwardly, toward the backwall of the housing.

11. The coupling of claim 10, wherein in an uncompressed state the central portion is one of substantially linear or substantially arcuate.

12. The coupling of claim 9, wherein the end portions are radiused.

13. The coupling of claim 9, wherein the inner surface of the gasket defines a central leg extending along the medial axis.

14. The coupling of claim 9, wherein the transition segment comprises at least one of a radiused portion and a linear portion.

15. The coupling of claim 14, wherein the transition segment comprises a radiused portion defining the positive slope.

16. The coupling of claim 14, wherein the transition segment comprises a linear portion defining the positive slope.

17. The coupling of claim 9, wherein the inner surface of the housing includes a first radiused portion, a second radiused portion with a straight line segment extending between the first and second radiused portions.

18. The coupling of claim 17, wherein the first radiused portion has a center of curvature disposed on one side of the straight line, the second radiused portion having a center of curvature disposed on the other side of the straight line, the first radiused portion defines a first cavity depth of the housing and the second radiused portion defines a second cavity depth less than the first cavity depth.

19. The coupling of claim 18, wherein the backwall portion defines a third cavity depth being any one of:
   (i) greater than the second cavity depth;
   less than at least the first cavity depth; or
   (iii) equal to the second cavity depth.

20. The coupling of claim 19, wherein the cavity defines a central axis of the coupling, the backwall portion being substantially linear extending substantially parallel to the central coupling axis.

* * * * *